United States Patent [19]

Durbin, Jr. et al.

[11] 4,353,093
[45] Oct. 5, 1982

[54] IMPULSE NOISE REDUCTION SYSTEM FOR TV RECEIVERS

[75] Inventors: Jesse Durbin, Jr., Carmel, Ind.; Dalton H. Pritchard, Princeton, N.J.

[73] Assignee: RCA Corporation, New York, N.Y.

[21] Appl. No.: 262,782

[22] Filed: May 11, 1981

[51] Int. Cl.³ .................. H04N 5/14; H04N 5/21; H04N 9/535; H04N 5/76

[52] U.S. Cl. ........................ 358/160; 358/167; 358/31; 358/21 R; 358/36; 360/38.1

[58] Field of Search .............. 360/38; 358/8, 36, 31, 358/167, 160, 188, 21 R

[56] References Cited

U.S. PATENT DOCUMENTS

| | | | |
|---|---|---|---|
| 2,996,576 | 8/1961 | Dolby | 329/50 |
| 3,241,078 | 3/1966 | Jones | 178/6.6 |
| 3,697,685 | 10/1972 | Lunn | 178/7.3 |
| 3,806,646 | 4/1974 | Hofmann | 178/7.3 |
| 4,158,209 | 6/1979 | Levine | 358/31 |
| 4,199,780 | 4/1980 | Taylor | 358/8 |
| 4,203,134 | 5/1980 | Christopher et al. | 358/128.5 |

OTHER PUBLICATIONS

Ser. No. 44,364 filed 6/1/79, Fuhrer, "Defect Compensation for Color Television".

Primary Examiner—John C. Martin
Attorney, Agent, or Firm—E. M. Whitacre; J. S. Tripoli; E. P. Herrmann

[57] ABSTRACT

A television receiver having circuitry for reducing the effects of impulse noise in the video signal is controlled by impulse noise detection circuitry responsive to the accompanying sound signal. Since impulse noise is relatively broadband it will occur simultaneously in both the broadcast picture and accompanying sound signals. Amplitude variations of the frequency modulated sound signal are indicative of the presence of noise, which variations are detected and utilized to generate a control signal whenever the noise amplitude exceeds a predetermined threshold.

17 Claims, 1 Drawing Figure

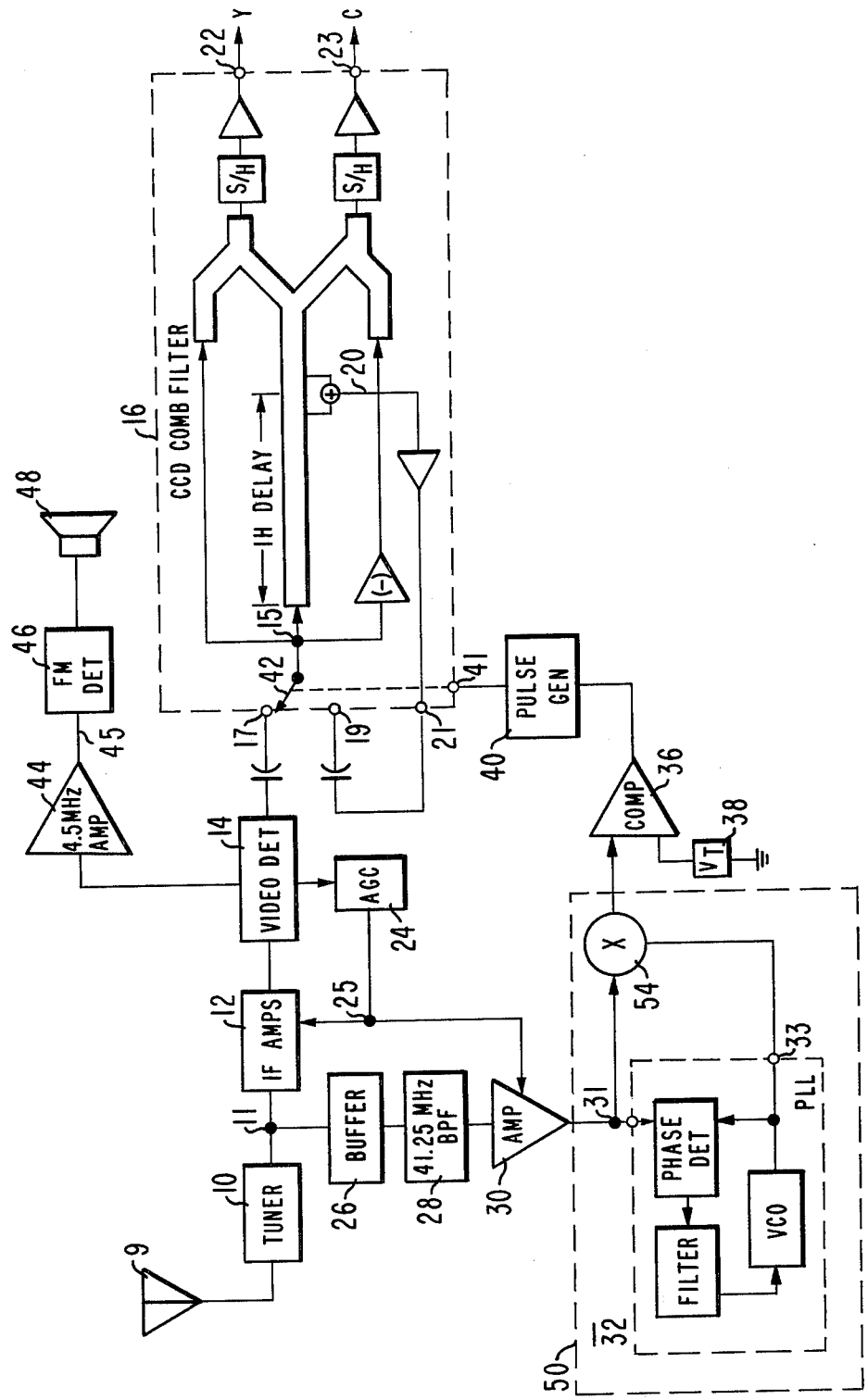

IMPULSE NOISE REDUCTION SYSTEM FOR TV RECEIVERS

This invention relates to television receiver circuitry and more particularly to circuitry for reducing electrical noise in the video signal which tends to create objectionable streaks and flashes in the picture display.

BACKGROUND OF THE INVENTION

Television receivers are susceptible to signal interference from various sources. The interference may arise as electromagnetic radiation which interferes with the broadcast RF signal. Typical sources of such interference are automotive ignition systems and household motors such as are found in vacuum cleaners and hair dryers, etc. The interference is manifested as bright or dark spots appearing in the TV picture.

Television pictures are formed by a scanning technique in which the image is partitioned into a plurality of horizontal lines. The horizontal lines are successively transmitted to the receiver where they are successively reconstructed into the original image on the picture screen. The signal information from image line to image line is highly redundant for a large percentage of images. R. Dolby, U.S. Pat. No. 2,996,576 took advantage of the line-to-line signal redundancy to minimize the effect of TV signal disturbances in video recording/reproducing systems. Upon detection of video signal loss, signal from the preceding image line is delayed by one image line period and substituted for the lost signal to minimize picture disturbance. Detection of signal loss in such recording/reproducing systems is facilitated by the fact that the video signal is recorded as frequency modulation of a carrier. Thus video signal loss may be detected by detecting the loss of the FM carrier, i.e., by envelope detection of the FM signal. See for example U.S. Pat. No. 4,199,780, R. J. Taylor, and U.S. Pat. No. 4,203,134, T. J. Christopher, et al.

Relatively large numbers of defects in video recording media makes it imperative to include signal compensation systems in video recording/reproducing apparatus. On the other hand the infrequency of particularly objectionable interference in broadcast TV signals has not warranted inclusion of systems in TV receivers for eliminating interference. However, with the incorporation of charge transfer device delay lines in TV receivers to perform comb filtering of the luminance signal, it has become practical to consider correcting video interference due to noise impulses. The interference correction is performed by video signal substitution as in the recording/reproducing systems, however, the detection of noise or defects in the video signal in the TV receiver presents problems different from defect detection in the recording/reproducing systems.

Typically the interference or noise creating the picture disturbance is not of the type or amplitude to cause elimination of the broadcast signal carrier, thus one cannot rely upon envelope detection of the broadcast signal carrier to determine when defects are present in the signal. In addition the broadcast signal is an amplitude modulated carrier so that amplitude changes are generally not indicative of the presence of noise or signal defects. Considering the baseband video signal, the dynamic signal range is very large and thus impulse noise can have signal values from barely perceptible to a level that actually overloads the receiver circuits.

It should be appreciated that the wide dynamic signal range makes detection of small signal defects particularly difficult, for to do so, the reference level of the defect detection system must track the average amplitude of the signal. Thus prior TV receivers having facility for noise cancellation were relegated to detecting only large levels of noise that exceeded a threshold determined by the maximum video signal level.

The present inventor, recognized that impulse noise, i.e., noise signal which may supersede the video signal on all or a part of an image line, typically has a broad energy spectrum and causes interference across many TV channels. Energy from the impulse is therefore likely to be included in the sound component of a particular TV signal even though the sound component of the TV signal is broadcast on a carrier separate from the video signal component of the particular TV signal. The sound component of the TV signal is a frequency modulated waveform, thus amplitude detection of such a signal for the purpose of detecting the presence of relatively small values of impulse noise is effective.

BRIEF SUMMARY OF THE INVENTION

The present invention includes circuitry in a television receiver for storing successive horizontal lines of video signal, which signal is selectively substituted for defective video signal in a current image line. A product detector responsive to the sound carrier at the IF signal frequency and an appropriate reference signal equal in frequency to the IF sound carrier and in-phase therewith, produces a nominally constant output signal representative of the amplitude at the FM sound carrier. The detector output signal free of audio signal components but containing the amplitude variations due to impulse noise is compared in a comparator circuit against a predetermined threshold signal, the comparator circuit generating a control signal whenever the detector output signal exceeds the threshold value. The control signal is applied to a conditioning circuit or pulse generator which generates a control pulse of desired duration. The control pulse enables a switch means to substitute the stored video signal for the defective real time video signal.

BRIEF DESCRIPTION OF THE DRAWINGS

The FIGURE is a block diagram of TV receiver circuitry embodying the present invention; which circuitry incorporates a 1 H delay line in comb filter circuitry for combing the luminance signal (Y) and the chrominance signal (C) from the composite baseband video signal.

Referring to the drawing, TV broadcast signal received by an antenna 9 is applied to the receiver RF amplifiers and tuning circuit 10. The tuner selectively translates the video and sound carrier signals of a particular channel to the intermediate carrier frequency (IF) of 45.75 MHz and 41.25 MHz respectively, which signals are available at connection 11. The 45.75 MHz carrier is basically an amplitude modulated waveform containing the composite video information. The 41.25 MHz sound carrier, on the other hand, is a frequency modulated signal. The amplitude of the sound signal is susceptible of variation concomitant with changes in the transmitted signal strength and of being reinforced by the energy of broad spectrum impulse noise.

The IF signals are amplified and filtered in IF circuitry 12 then applied to video detector 14 which translates the IF video signal to a composite baseband signal and the IF sound signal to a 4.5 MHz FM signal. The baseband video signal is applied to a comb filter 16 which separates the chrominance (C) and luminance (Y) signals (at terminals 23 and 23 respectively) from the composite signal for utilization by further signal processing circuitry (not shown).

The 4.5 MHz FM sound signal from video detector 14 is amplified in a narrow band amplifier 44 (to reject the chroma subcarrier) then demodulated in the FM detector 46. FM detector 46 generates an audio output signal which is then applied to the speaker 48.

An AGC circuit 24, responsive to signal from video detector 14, generates a gain control signal in accordance with the average amplitude of the received video signal. The gain control signal at connection 25 which is in inverse proportion to the received video signal strength is applied to the IF amplifier to condition the IF signal strength to a relatively constant level and thereby to achieve a constant picture contrast independent of the strength of the received signal.

In general the circuit elements including the tuner 10, IF amplifiers 12, video detector 14, AGC circuit 24 and sound circuits 44 and 46 are assumed to be typical of circuits formed in a conventional TV receiver.

The comb filter 16 is realized with charge transfer device technology and includes a charge coupled device (CCD) register 1-H delay line integral with CCD summing circuits to accomplish the requisite transversal filter function to comb the video signal for separation of the interlaced luminance and chrominance signals. The CCD delay line is actually a plurality of serially connected storage elements from which sampled data is successively translated from one element to the next element at a predetermined rate. The signal may be non-destructively tapped from any one or more of these storage sites in order to realize a particular signal delay. In the arrangement shown a delayed signal is available at connection 20 and after amplification is produced at terminal 21. Signal available at terminal 21 is then routed to comb filter input terminal 19. Additional signal processing may be provided between terminals 21 and 19. Depending upon whether such processing is provided or not determines the period that the signal is delayed at connection 20, so that the signal is ultimately delayed by one horizontal image line at terminal 19. The tapped and delayed signal is conditioned to have its chrominance signal shifted 180° with respect to the untapped delayed signal remaining in the CCD device. For a detailed description of a CCD comb filter circuit the reader is directed to U.S. Pat. No. 4,158,209, Levine. For a detailed description of circuitry for phase inverting the chrominance component of a tapped video signal see copending application Ser. No. 44,364 filed June 1, 1979 and entitled, "Defect Compensation for Color Television". Both of the foregoing references are incorporated herein by reference.

The comb filter 16 is serially connected in the video signal circuit between the video detector 14 and further processing circuitry (not shown) connected at terminals 22 and 23. Real time or current video signal is applied to CCD filter terminal 17 and then applied to the CCD register input connection 15 via the switch 42. If signal defects, i.e., noise, have been determined to be present in the real time signal, delayed signal at terminal 21 is temporarily substituted for the real time signal by positioning the switch 42 to access signal applied to comb filter input terminal 19. The signal previously delayed by one horizontal image line is recycled in the register.

The foregoing demonstrates an advantageous technique of substituting delayed signal for real time signal in a serial video signal circuit connection for a color receiver utilizing a particular type of comb filter. An alternative arrangement for use in either color or black and white TV receivers may comprise a simple 1 H delay line and a switch. The delay line has its input terminal connected for receiving real time video signal and the switch selectively applies either the real time signal, or the delayed signal from the delay line directly to the further processing circuitry. In this type of arrangement video signal does not recycle in the delay line but merely passes through once subject to being delayed one image line. It should be noted that the signal may be delayed by an integral number of horizontal line periods to effect the same basic result. For example, the delay circuit may comprise a 2-H delay line in which case it is unnecessary to invert the phase of the chrominance component of the video signal.

Impulse noise or defect detection in the video signal is performed by monitoring the accompanying sound signal. This is possible because impulse noise has a broad frequency spectrum and the picture and sound carriers are contained within a relatively narrow spectrum. Whatever electrical impulse noise affects the broadcast picture signal will therefore probably affect the broadcast sound signal in a similar manner. The advantage of monitoring the sound signal for impulse noise over the picture or video signal lies in the sound signal being frequency modulated. The amplitude of the sound signal is thus nominally constant and any rapid deviation from the constant value is presumed to be due to noise.

Impulse noise will occur in the sound signal in the RF, IF and the detected video 4.5 MHz signals. It is possible to monitor the amplitude of either of the sound signal frequencies for the occurrence of impulse noise. The present inventors found it particularly advantageous to monitor the IF sound signal since at this point the signal is of reasonable frequency on which to operate and the signal has undergone limited processing. In addition the IF signal occurs at a point in the receiver circuitry which proceeds the signal substitution or noise compensation circuitry. Consequently signal delay elements to temporally align or synchronize the signal applied to the compensation circuitry with the detection of impulse noise may be obviated.

The sound signal to be monitored is accessed from the circuit at connection 11 by a buffer circuit 26. Buffer 26, e.g., a common collector amplifier, taps the signal without loading the RF or IF circuitry. Signal from the buffer 26 is applied to a narrow band, bandpass filter which passes substantially only the IF sound carrier and its immediate sidebands. It is necessary that the picture signal be attenuated in the impulse noise detection system since the picture carrier is amplitude modulated. The picture carrier modulations would tend to contribute to the amplitude modulations detected in the sound carrier which in turn would mandate a coarser threshold setting for noise detection. On the other hand the passband must be wide enough to pass the maximum noise energy so that noise impulses having relatively small amplitude and low energy content are detectable.

The output signal from bandpass filter 28 is amplified in the gain controlled amplifier 30. The gain control signal applied to amplifier 30 is taken from the video IF gain control circuit 24, which signal varies inversely as the IF picture carrier and responds to maintain the average IF picture carrier amplitude relatively constant. Amplifier 30, controlled by the picture AGC signal, conditions the sound carrier so as to have a constant long term average amplitude, and tends to remove normally cocurring amplitude fluctuations not associated with noise. The time constants of the gain control system are not sufficiently fast to limit the occurrence of amplitude fluctuations due to noise impulses. In general then, except for impulse noise induced amplitude fluctuations, the sound carrier is substantially constant permitting the detection of low levels of noise signal, e.g., setting a fine noise threshold.

The output signal from amplifier 30 is applied to a synchronous detector 50. As is well known in the signal detection art, a synchronous detector operating on an FM waveform will detect only the amplitude fluctuations of that waveform if the applied detector reference frequency is maintained in a prescribed constant phase relationship with the FM signal. The FM signal components are ignored by the circuit until the reference frequency and IF signal approach a quadrature phase relationship. Typically the phase relationship between the reference signal and the input signal (sound carrier) for amplitude detection is one of zero phase difference or 180 degree phase difference.

The circuitry 50 is one particular example of an applicable synchronous detector. This circuitry comprises a phase locked loop 32 arranged to be responsive to the sound signal at terminal 31 for generating a constant amplitude reference signal in phase with the sound signal at terminal 33. The reference signal at terminal 33 and the sound signal at 31 are applied to a detector 54, the output signal of which corresponds substantially to amplitude variations due to impulse noise present on the sound carrier. See U.S. Pat. No. 3,241,078, Jones, for an example of the detector 54 type of circuitry and U.S. Pat. No. 3,697,685, Lunn, for an example of a typical synchronous detector used for amplitude demodulation of the IF video signals in TV receivers.

The amplitude variations produced at the synchronous detector output signal are applied to a first input terminal of comparator circuit 36. A DC threshold signal from source 38 is applied to a second input terminal of comparator 36. The comparator produces an output state change whenever the synchronous detector output signal passes through the threshold level. It might be noted at this point that the synchronous detector output signal will be a slowly varying AC signal having a relative small amplitude except when impulse noise or other dramatic signal disturbance occurs, in which case there will be a relatively large, fast output signal change which may go positive or negative in direction due to ringing associated with, e.g., noise impulse interaction with the tuned RF circuitry. Thus it may be desirable to include a second comparator circuit arranged with a threshold of opposite polarity in order to detect synchronous detector output signal excursions of either polarity or perhaps the two comparators may be logically interconnected to produce an output signal only for a response known to be correlated to an impulse noise ringing characteristic.

The comparator output signal is conditioned by pulse generator 40 to enable/disable the switch 42 for effecting video signal substitution. Pulse generator 40 may be a monostable multivibrator which generates a pulse of prescribed amplitude and duration (typically in the range of 1-10 microseconds). Test data indicates that impulse noise duration is generally grouped in the 1-3 microsecond range, and a three microsecond control pulse is sufficient to compensate for the majority of noise impulses. On the other hand, in special environments it may be desirable to terminate video substitution at a specified time each interval, for example, during the horizontal blanking period. In this case the pulse generator may be an edge triggered flip flop triggered on (set) by the comparator signal and off (reset) by a separate timing pulse, e.g., the horizontal sync pulse.

The foregoing has described a video signal noise compensation circuit utilizing a delay line for substituting delayed signal when the current or real time signal contains noise above a certain threshold level. The noise detecting circuitry, however, is not limited to this application and may be utilized in conjunction with other TV noise suppression or compensation circuitry. An example of an alternate noise compensation system is shown and described in U.S. Pat. No. 3,806,646, Hofmann, incorporated herein by reference. The Hofmann invention is a noise processor for rendering the automatic gain control (AGC) system in a television receiver insensitive to noise pulses present in the composite video signal. A noise gating pulse is generated for the occurrence of each large amplitude noise pulse (impulse noise) in the composite video signal. Responsive to the noise gating pulse the AGC system operates in a way which renders it unresponsive to the composite video for a prescribed interval. The noise detection circuitry of the present invention is certainly adaptable to producing the noise gating pulse in the Hofmann circuit.

What is claimed is:

1. A television receiver for processing broadcast picture and sound signals comprising:
   circuitry responsive to a control signal for reducing the effects of electrical noise present in the picture signal; and
   noise detection circuitry responsive to said sound signals for generating said control signals.

2. In a television receiver of the type having a tuner for frequency translating selected broadcast television signals to a signal comprising an amplitude modulated IF picture signal and an associated frequency modulated sound signal, having further processing circuitry for conditioning said IF picture signal to a video signal for display on a kinescope and said sound signal to baseband audio, and having noise compensation circuitry associated with said processing circuitry, said compensation circuitry responsive to a control signal for reducing effects of electrical noise in the video signal, circuitry for generating said control signal comprising:
   means for detecting amplitude variations in the frequency modulated sound signal indicative of the presence of noise in the video signal; and
   circuitry responsive to said detected amplitude variations for producing a control pulse equivalent to said control signal whenever said amplitude variations exceed a predetermined threshold signal.

3. The television receiver set forth in claim 2 wherein the means for detecting amplitude variations in the sound signal includes a detector and frequency selective circuitry connected for application of the IF signal, said frequency selective circuitry passing the sound signal to an input terminal of the detector substantially to the exclusion of the picture signal.

4. The televison receiver set forth in claim 3 wherein the detector is a synchronous detector.

5. The television receiver set forth in claim 4 further including a gain control amplifier in serial connection between said tuner and said synchronous detector for amplifying the IF sound signal, said amplifier having a gain control signal input terminal;

means responsive to the picture signal for generating said gain control signal, in inverse relation to the average strength of the picture signal, whereby the gain control amplifier maintains the average strength of the IF sound signal substantially constant.

6. The television receiver set forth in claims 2, 3, 4 or 5 wherein the circuitry for producing the control pulse comprises:

a comparator having a first input terminal connected for applying said detector amplitude variation from said detecting means, a second input terminal connected for applying a substantially constant threshold signal, said comparator producing at an output terminal thereof an output potential transition between one of two output states whenever said amplitude variations pass through the amplitude of the threshold signal;

a monostable multivibrator having a trigger input terminal connected to the comparator output terminal, said monostable multivibrator generating at an output terminal thereof said control pulse responsive to a predetermined state change of the comparator output signal.

7. In a televison receiver of the type for reproducing video images and accompanying sound signals broadcast on designated picture and sound RF carrier frequency signals and having a tuner circuit for selectively translating particular RF broadcast signals to intermediate frequency signals, having detector circuitry for reducing the intermediate frequency signals to baseband video and sound signals and further processing circuitry for conditioning the baseband video signal for display on a kinescope, circuitry for reducing impulse noise in the baseband video signal comprising:

means for delaying said baseband video signal by a predetermined period;

means responsive to amplitude deviations in said sound signal corresponding to impulse noise thereon for generating a control signal; and means responsive to said control signal for substituting undelayed baseband video signal applied to said further processing circuitry with said delayed video signal.

8. The television receiver set forth in claim 7 wherein the means for delaying the baseband signal comprises a charge transfer device delay line for sequentially storing and translating signal samples between serially connected stages with a capacity for delaying baseband video signal corresponding to an integral multiple of horizontal lines of a displayed image.

9. The television receiver set forth in claim 7 wherein the means for generating a control signal is connected to be responsive to the intermediate frequency sound signal.

10. The television receiver set forth in claim 9 wherein the means for generating a control signal comprises:

a bandpass filter having an input terminal connected to an output terminal of the tuner circuit for selectively passing the intermediate frequency sound signal to an output terminal of said bandpass filter;

means connected to the output terminal of the bandpass filter for detecting amplitude variations in the intermediate frequency sound signal and generating said control signal upon said amplitude variations exceeding a predetermined value.

11. The television receiver set forth in claim 10 wherein the means for detecting amplitude variations comprises a synchronous detector responsive to the intermediate frequency sound signal.

12. The television receiver set forth in claim 10 wherein the means for detecting amplitude variations in said sound signals comprises:

an amplifier having an input terminal connected to the bandpass filter output terminal and having an output terminal;

a phase locked loop including a voltage controlled oscillator, said phase locked loop responsive to the intermediate frequency sound signal for generating a reference frequency signal in a prescribed substantially constant phase relationship with the intermediate frequency sound signal available at the output terminal of said amplifier;

a synchronous detector having first and second input terminals respectively connected for receiving the reference frequency signal and the intermediate frequency sound signal available at the amplifier output terminal, said synchronous detector generating at an output terminal thereof a signal related to amplitude variations in the intermediate frequency sound signal.

13. The television receiver set forth in claim 12 wherein the amplifier is a variable gain amplifier, the amplifier gain response being established by a gain control input signal, said gain control signal being generated by circuitry responsive to the video signal and being in inverse proportion to the video signal strength.

14. The television receiver set forth in claim 11 or 13 wherein the means for generating the control signal further includes:

a substantially constant reference signal;

a comparator having first and second input terminals for respectively applying said constant reference signal and the output signal from the synchronous detector, said comparator generating an output signal whenever the synchronous detector output signal exceeds the constant reference signal.

15. The television receiver set forth in claim 14 wherein the means for generating the control signal further includes circuitry, responsive to the comparator output signal, for generating at an output terminal thereof a signal having a predetermined amplitude and duration.

16. The television receiver set forth in claim 15 wherein the circuitry responsive to the comparator output signal is a monostable multivibrator.

17. The television receiver set forth in claim 14 wherein the means for generating the control signal further includes circuitry, responsive to the comparator output signal, for generating at an output terminal thereof a signal havng a predetermined amplitude and a duration related to the duration of the detected impulse noise.

* * * * *